United States Patent [19]

Chakravarty et al.

[11] Patent Number: 5,161,158
[45] Date of Patent: Nov. 3, 1992

[54] FAILURE ANALYSIS SYSTEM

[75] Inventors: Abhijit J. Chakravarty, Renton, Wash.; Yoshiki Nakamura, Yokohama, Japan

[73] Assignee: The Boeing Company, Seattle, Wash.

[21] Appl. No.: 421,579

[22] Filed: Oct. 16, 1989

[51] Int. Cl.⁵ .............................................. G06F 11/00
[52] U.S. Cl. .................................................... 371/15.1
[58] Field of Search ..................... 371/15.1, 16.1, 22.1, 371/17, 25.1, 51.1; 324/73.1

[56] References Cited

U.S. PATENT DOCUMENTS

| | | | |
|---|---|---|---|
| 3,787,670 | 1/1974 | Nelson et al. | 235/153 AC |
| 3,928,830 | 12/1975 | Bellamy et al. | 235/153 AK |
| 4,628,509 | 12/1986 | Kawaguchi | 371/10.3 |
| 4,631,719 | 12/1986 | Huffman et al. | 371/20.5 |
| 4,642,782 | 2/1987 | Kemper et al. | 364/550 |
| 4,707,796 | 11/1987 | Calabro et al. | 364/552 |
| 4,719,587 | 1/1988 | Berte | 364/552 |
| 4,727,545 | 2/1988 | Glackemeyer et al. | 371/23 |
| 4,740,887 | 4/1988 | Rutenberg | 371/11.3 |
| 4,841,456 | 6/1989 | Hogan, Jr. et al. | 364/550 |
| 4,954,964 | 9/1990 | Singh | 364/513 |
| 4,964,124 | 10/1990 | Burnett | 371/15.1 |
| 4,964,125 | 10/1990 | Kim | 371/29.1 |

OTHER PUBLICATIONS

Fox et al., "Techniques for Sensor-Based Diagnosis," *Proceedings of the Eighth International Joint Conference on Artificial Intelligence*, vol. 1, pp. 158–163.

Finin et al., "Forest-An Expert System for Automatic Test Equipment," *1984 IEEE*, pp. 350–356.

Primary Examiner—Robert W. Beausoliel
Assistant Examiner—Phung My Chung
Attorney, Agent, or Firm—Christensen, O'Connor, Johnson & Kindness

[57] ABSTRACT

A failure analysis system for simulating the effect of a subsystem failure in an electronic system. The failure analysis system includes a knowledge base, a user interface, and a failure analysis component. The knowledge base simulates the electronic system in a variety of operating configurations related to the status of a source selection switching mechanism and/or different system modes. The user interface receives simulation condition data that identifies an operating configuration and failure data identifying at least one subsystem failure. The failure analysis component simulates the propagation of the subsystem failure effect through the electronic system by analyzing the failure data in accordance with the knowledge base and the simulation condition data, and generates a set of subsystem failure responses that would occur in the electronic system if the failure actually occurred. The failure analysis system also performs a fault isolation analysis. The user interface receives response data identifying a failure response. The failure analysis component identifies the source of the failure response in the electronic system by backtracking the failure response data in accordance with the knowledge base and the simulation condition data. One or more possible subsystem sources of the failure response identified by the failure response data are identified.

12 Claims, 7 Drawing Sheets

AIRPLANE CONFIGURATION: NWA1

FMC MASTER SWITCH: L

| | CAPT ISS | | F/O ISS | |
|---|---|---|---|---|
| FLT DIR | L | FD-L FD-R | R | FLT DIR |
| NAV | L FMC | ON ON | R FMC | NAV |
| EIU | AUTO | SHOW SETUP | AUTO | EIU |
| IRU | L | | R | IRU |
| AIR DATA | L | DEFAULT | R | AIR DATA |

AUTO FLIGHT MODE                              FCC

| PITCH MODE | VNAV | ENGAGED FIRST | FCC-L |
| ROLL MODE | LNAV | NOT ENGAGED | FCC-C |
| A/T MODE | VNAV | NOT ENGAGED | FCC-R |
| COMBINED MODE | CRUISE | | |

SPEED (KNT) 280   ALTITUDE (FT) 35000

*FIG. 2.*

```
UNDER THE SETUP CONDITION:

[NWA1/   ------/-/-/1CR/NA/NA/AA/--/-/1]

IF ANY ONE OF THESE DATA:

ALTITUDE (BARO #4)          (H4B6)       [212]     ON <ADC-L-A-1>
    INDICATED AOA               (IAOA6)      [221]
    IMPACT PRESSURE             (QC6)        [215]
    TRUE AIRSPEED               (TAS6)       [210]
    MACH                        (M6)         [205]
    COMPUTED AIRSPEED           (CAS6)       [206]
    MAX OPRTG SCHEDULE          (ASMX6L)     [207]

CONTAIN(S) ANY ONE OF THESE CONDITIONS:

[SSM FAIL]
    [NO ACTIVITY]
    [FCC-L SSFD DEFECTS FAIL]

THEN, THE EXPECTED RESPONSE(S) ARE (IS):

[/FCC747-L/  SET BIT 11 OF OCT LAB 275 FOR /AUTOPILOT/ CAUTION
                 ON EICAS]
    [/FCC747-L/  SET BIT 12 OF OCT LAB 274 FOR PITCH FMA FAIL]
    [/FCC747-L/  SET BIT 21 OF OCT LAB 275 FOR ROLL FMA FAIL]
```

*FIG. 3A.*

UNDER THE SETUP CONDITION:
[NWA1/--/----------/-/--/---/--/--/--/--/-/-]
BUS:
IRU-R-A-3
IS THE SOURCE BUS FOR:
IFMC-L
FOR THE FOLLOWING INPUT SIGNALS:

| SIGNAL NAME | MNEMONIC | OCTAL LABEL |
|---|---|---|
| E-W VELOCITY | VEW4X | 367 |
| N-S VELOCITY | VNS4 | 366 |
| PRESENT POS - LAT | LAT4 | 310 |
| PRESENT POS - LONG | LONG4 | 311 |
| GROUND SPEED | VGS4 | 312 |

UNDER THE FOLLOWING CONDITIONS:
BUS:
IRU-L-A-3
HAS ONE OF THE FOLLOWING FAILURE MODES:
DATA WITH NCD
NO ACTIVITY

AFFECTING SIGNALS:

| SIGNAL NAME | MNEMONIC | OCTAL LABEL |
|---|---|---|
| E-W VELOCITY | VEW4X | 367 |
| N-S VELOCITY | VNS4 | 366 |
| PRESENT POS - LAT | LAT4 | 310 |
| PRESENT POS - LONG | LONG4 | 311 |
| GROUND SPEED | VGS4 | 312 |

AND BUS:
IRU-C-A-3
HAS ONE OF THE FOLLOWING FAILURE MODES:
DATA WITH NCD
NO ACTIVITY

AFFECTING SIGNALS:

| SIGNAL NAME | MNEMONIC | OCTAL LABEL |
|---|---|---|
| E-W VELOCITY | VEW4X | 367 |
| N-S VELOCITY | VNS4 | 366 |
| PRESENT POS - LAT | LAT4 | 310 |
| PRESENT POS - LONG | LONG4 | 311 |
| GROUND SPEED | VGS4 | 312 |

*FIG. 3B.*

FAILURE ANALYSIS SYSTEM

FIELD OF THE INVENTION

The present invention relates to a system for testing electronic system design and, specifically, to an artificial intelligence system for system level failure analysis.

BACKGROUND OF THE INVENTION

Changing technology in the electronics field is driving the design of avionics systems, as well as other electronics applications, towards increased performance, functionality, and sophistication. As avionics systems become more complex, it becomes more difficult to analyze an entire system to provide a clear perspective of system behavior in the presence of faults. This difficulty in analyzing system behaviour affects the areas of system design, testing, and maintenance.

In avionics systems, failure propagation and fault isolation are two important aspects of system behavior. Failure propagation refers to the effect on overall system performance of a system component failure. Fault isolation refers to the process of locating a failed system component. A failed component normally creates a failure indication on the flight deck of an aircraft, commonly referred to as a flight deck effect. The flight deck effect is thus the clue to the faulty component. These same types of failure analyses must be performed in other electronics systems that share certain common characteristics with avionics systems.

Avionics systems are designed as and built from subsystems. The subsystems are interconnected by signal carrying buses, connected to power sources, etc. Most subsystems contain one or more Line Replaceable Unit(s) (LRU). By design, each LRU performs a specific task and is engineered to meet specific specification requirements.

Avionics subsystems were at one time relatively simple and tended to function somewhat independently of other subsystems. System operational characteristics and behavior in the event of equipment failures could be analyzed by a few engineers using available analytical and test tools. With the advent of digital avionics, subsystems have become more complex, more integrated with, and more inter-dependent upon one another. The engineering resources required to analyze and test these integrated systems are far greater than were required for the earlier, simpler systems.

One of the complex and challenging tasks facing modern avionics design/development engineers is that of defining all significant effects on the avionics system of one or more equipment failures. A comprehensive analysis requires the consideration of multiple avionics system operating configurations. Massive software simulation and/or hardware test systems are often developed to assist engineers in performing the required design and system validation analyses. The software simulation and hardware test systems are essentially an attempt to duplicate the entire avionics system. In order to analyze such a software simulation system in real-time, one or more large mainframe computers are required. Generally, such simulation systems utilize conventional programming language, e.g., FORTRAN or PASCAL. The use of these languages contributes to the immense size of the simulation systems.

One of the tasks for which these software simulations or test systems may be used is to assess failure effects of simulated system faults. These simulation and test systems take a long time to develop and the results they provide may come late in a development program when indicated system changes are costly to make.

When an avionics system design is completed, all of the development information and performance requirement information are integrated into a package of avionics system documentation that describes an "as-built" system. The documentation includes LRU specifications, signal bus connections, power source information, etc. The avionics system documentation is later used as a reference tool by the maintenance crews responsible for the maintenance and repair of the avionics system. Such comprehensive system documentation is not available until the system is completed, i.e., until LRU designs and interconnections are finalized.

Modern avionics systems are designed to identify to the maintenance crew the faulty LRU(s) in the event of equipment failure(s). Many subsystems include self-diagnostic capabilities. An LRU fault may be flagged by a light on the LRU itself, or an indication on an overall system operation indicator. Sometimes, replacing the identified LRU does not clear the fault indication. When this occurs it may be necessary for the maintenance crew to manually trace and isolate the fault using test equipment and system design information provided in the maintenance manuals. Fault isolation may also be performed when no fault identification is provided by the avionics system but a fault is otherwise apparent.

During a fault isolation analysis, the failure response, i.e., flight deck effect, is traced "backwards" to a source LRU that may have caused the flight deck effect to be generated. During the analysis, the aircraft operating configuration at the time the flight deck effect was generated must be taken into account when the system analyst refers to the system documentation. As with the failure propagation simulation, manually isolating faults may be a time-consuming and difficult process.

Certain characteristics that are inherent in complex avionics systems have heretofore precluded efficient comprehensive analysis of system failure response. These characteristics include: the existence of multiple component levels in a system; the use of redundant component sources; LRU behavior response based on system mode and external conditions; and the need for extremely fast system response to failures, generally on the order of tenths of seconds. These characteristics produce a system that is difficult to physically test and to model for design, testing and maintenance purpose. Other complex electronic systems including some or all of these characteristics suffer from the same testing and modeling problems as avionics systems.

The effect of multiple component levels on failure analysis is illustrated by the fact that an indication that an LRU has failed may be generated due to a fault elsewhere in the system. The LRU, or a signal output by the LRU, may fail because of a power failure to the LRU, an input bus physical failure, an input signal failure, a failed LRU component, etc. The system complexity suggests that if an LRU is only suspected of being in a failed state, it is preferable to first determine the exact source of the failure rather than immediately replacing the LRU in an attempt to rectify the problem.

One reason for the signal source redundancies in avionics systems is the high level of functional availability required in aircraft operation. As an example of the use of signal source redundancy, important LRU signals are usually generated by more than one source, e.g., a left and right source. The LRUs that receive multiple signals must be provided with a way of selecting an initial signal source, determining when the signal source has failed, and selecting an alternate source. In instances where there are more than two signal sources, e.g., left, center, and right sources, a hierarchy of source selection is required. Source selection may be automatically controlled by hardware or software that is a part of an LRU or the avionics system. Additionally, for certain subsystems, the source selection is performed manually by the flight crew in response to a flight deck effect. In order to comprehensively test avionics system behavior, it is necessary to test the system response in a variety of operating configurations that are each defined by a set of initial source selections.

An LRU's behavior may be highly dependent upon system mode and external conditions. The system mode describes the aircraft's flight trajectory. The trajectory includes take-off, climb, cruise, descend, land, and go-around modes. Each mode is further described by pitch, roll, and throttle, i.e. power, characteristics. External conditions include altitude, speed, etc. Thus, besides having certain behavioral characteristics based on input source selection, an LRU's behavior may also be contingent on the system mode and/or external conditions.

Present avionics design systems and automated test equipment usually do not provide tools for testing the effects of LRU design modifications on the overall system prior to system completion. Further, once an avionics system design is completed, it is a time consuming and tedious process to simulate the propagation of a failure or to isolate a fault in the avionics system using system documentation and test equipment. Until now there were no simulation or test systems that could satisfy in a timely manner the needs of both design/development engineers and airline maintenance personnel in the area of failure analyses. The present invention is directed toward overcoming the problems in design, testing, and maintenance of avionics systems as described above, as well as other problems in the prior art.

SUMMARY OF THE INVENTION

The failure analysis system of the present invention provides a method and apparatus for performing failure analysis on a simulated electronic system. The electronic system to be simulated and analyzed is composed of subsystems and can be described in terms of subsystem interconnection, mode selection, subsystem input signal source selection, and subsystem failure response indications. A characteristic of the electronic system is that at least two of the subsystems are related in that they transmit redundant output signals to a destination subsystem. For each multi-source subsystem, the electronic system must include at least one switching mechanism for selecting one of the redundant subsystems as the primary input signal source. Further, the electronic system to be simulated and analyzed has one or more system modes. The operating configuration of the electronic system depends on the selection of the input signal source(s) and/or the system mode. The failure analysis system utilizes a knowledge base including data that defines a variety of operating configurations for the electronic system.

In accordance with the present invention, the failure analysis system obtains simulation condition data from a system analyst in order to identify the electronic system operating configuration that is to be analyzed. The failure analysis system also receives failure data, which identifies the failure to be analyzed. The failure analysis system simulates the propagation of the failure's effect through the electronic system, by analyzing the failure data via the knowledge base in accordance with the simulation condition data. If the knowledge base describes an as-built electronic system, the failure analysis system simulates the behavior of the electronic system in the operating configuration identified by the simulation condition data. By altering the simulation condition data, a number of operating configurations can be tested. Alternatively, during the design of the electronic system, the knowledge base can be modified to reflect modifications to the electronic system design. The failure analysis system then simulates the propagation of a failure's effect through an electronic system built according to the modified knowledge base having the specific operating configuration described by the simulation condition data.

In accordance with further aspects of the present invention, the simulation condition data includes source selection data identifying a switching mechanism selection.

In accordance with additional aspects of the present invention, the simulation condition data includes mode selection data identifying a system mode of the electronic system.

In accordance with the other aspects of the present invention, the failure analysis system is integrated into a processor including a central processing unit, a memory, and input and output devices. The failure analysis system comprises a knowledge base, a user interface and a failure analysis means. The knowledge base describes the electronic system in a variety of operating configurations related to the status of one or more source selection switching mechanisms and/or the system mode. The knowledge base includes subsystem interconnection data and rule data. The rule data includes subsystem failure rules and source selection rules that describe the subsystem failure responses and input source selection logic. The rule data includes operating configuration contingencies. The user interface receives simulation condition data and failure data from a system analyst or other data source. The failure analysis system identifies, from the interconnection data, which destination subsystems are directly connected to the failed subsystem and determines, from the rule data, each destination subsystem's response to the failure. If the destination subsystem's response is to fail, then that destination subsystem is treated as the next failed subsystem. The steps of identifying the destination subsystems and determining the destination subsystems' responses are repeated until all of the failure paths are considered. The result of the simulation is a set of subsystem failure responses that would occur in the electronic system if the initial subsystem failure actually occurred.

In accordance with other aspects of the present invention, the failure analysis means further includes means for predicting the source of a failure response by simulating the isolation of a fault in an electronic system that is described by the knowledge base data in accordance with the simulation condition data. The user interface receives failure response data from the system analyst or other data source. The failure response data identifies a failure. Each source subsystem which may have generated the failure response is identified by referencing the interconnection data. Each of the failure rules that may have caused a source subsystem to generate the failure response are also identified. The responses identified by the failure rules are then treated as the next failure responses. The steps of identifying possible source subsystems and related failure rules are repeated for each next failure response until all failure source subsystems are identified. The failure analysis means produces a list of the possible source(s) of the initial failure response in an electronic system in an operating configuration that is described by the integration of the knowledge base with the simulation condition data.

In accordance with additional aspects of the present invention, the electronic system is an avionics system and the subsystems contain Line Replaceable Unit(s) (LRU). Additionally, the failure analysis means includes expert system means for controlling the failure propagation simulation and fault isolation analysis, and an artificial intelligence shell for interpreting the expert system means via the central processing unit. The failure analysis means is dynamic, allowing early implementation of the test system, i.e., with only partial electronic system design information. Further, it is a straightforward task to keep the failure analysis system current with the electronic system development.

In accordance with still further aspects of the present invention, the operating configuration is also related to external conditions and the simulation condition data includes data describing external conditions such as airspeed, altitude, etc.

The failure analysis system of the present invention is an electronic system development tool that is used to identify potential subsystem design and interconnection problems as the overall system is being developed. One reason the system is efficient is because it is designed for the specific purpose of analyzing system behavior. The system allows simulated failure effect propagation through an electronic system to be readily analyzed in a variety of operating configurations. This approach to performing system failure analyses, beginning early in the design cycle, yields substantial benefits to system developers. The failure analysis system is also a useful maintenance and trouble shooting tool since it is useful for simulating failure effect propagation and performing fault isolation analysis in completed electronic systems by establishing a knowledge base from the as-built system documentation and taking into account actual source selections, system mode, and external conditions during the simulation. Further, for avionics systems, the failure analysis system generates the LRU failure information, e.g., a certification failure analysis deliverable, that is required to obtain FAA certification.

BRIEF DESCRIPTION OF THE DRAWINGS

FIG. 2 is a screen presentation of the simulation conditions that are established by the embodiment of the present invention illustrated in FIG. 1;

FIGS. 3A and 3B are screen presentations of the LRU failure rules and source selection rules that are established by the embodiment of the invention illustrated in FIG. 1;

DESCRIPTION OF THE PREFERRED EMBODIMENTS

Figure 1:
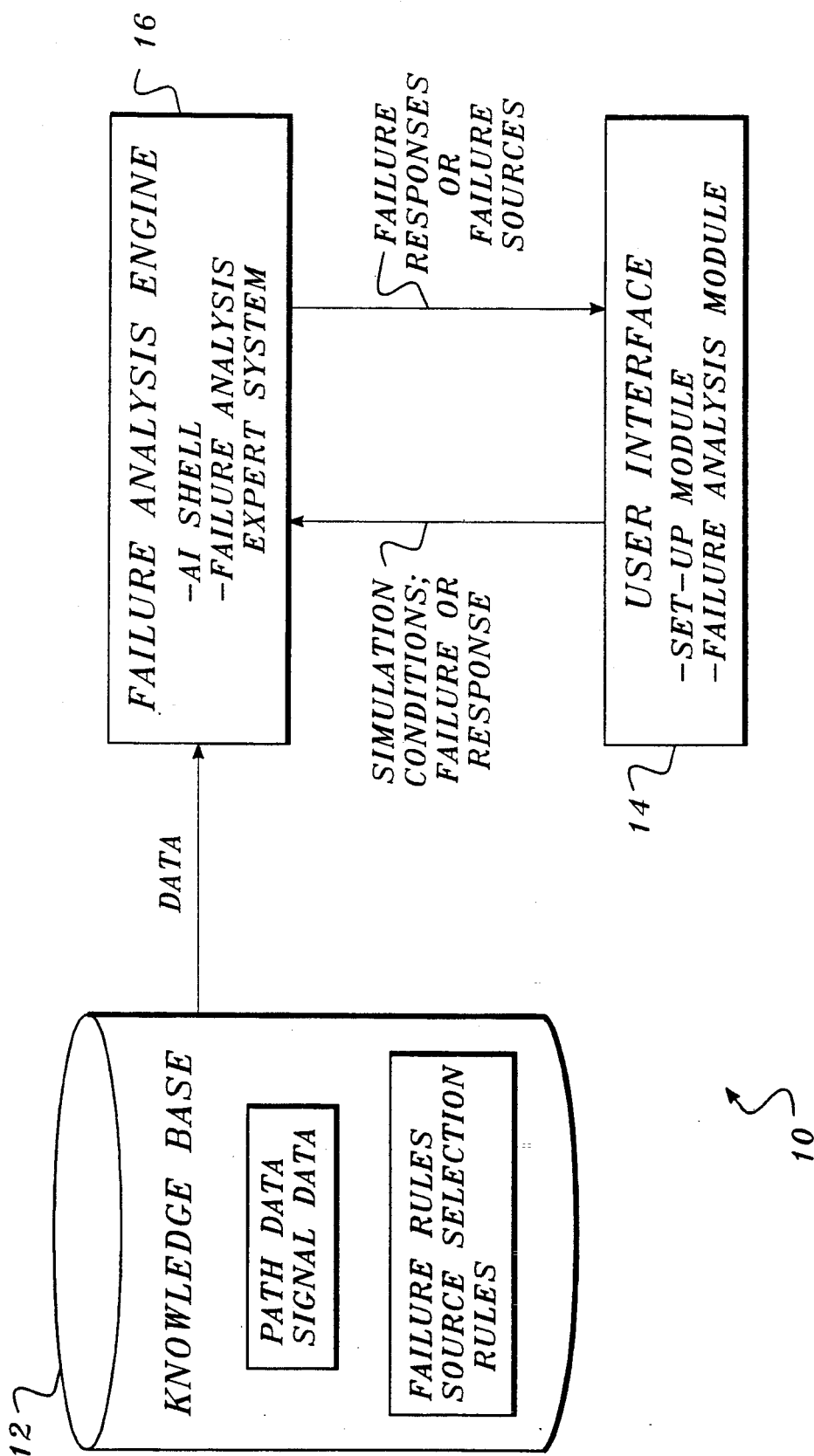
FIG. 1 is a block diagram of a preferred embodiment of a failure analysis system formed in accordance with the present invention.

With reference to FIG. 1, the failure analysis system 10 of the present invention includes a knowledge base 12, a user interface 14 and a failure analysis engine 16. For ease of description, the failure analysis system will be described in terms of an avionics system. However, it is to be understood that a failure analysis system formed in accordance with this invention is also suitable for use with other electronic systems that exhibit certain operating characteristics related to subsystem connectivity, redundant signal source availability, system mode, external operating conditions, and temporal constraints on operation.

An avionics system's operating configurations are generally defined by the knowledge base 12. Taken as a whole, the knowledge base describes a range of avionics system physical configurations and behavioral characteristic for a single aircraft. To identify a specific operating configuration for a simulation, simulation condition parameters are received by the user interface 14 from a system analyst or other source. The system analyst also identifies the type of simulation to be performed, i.e., failure propagation or fault isolation, and selects the component failure or failure response to be analyzed via the user interface.

During the simulation of a failure effect propagation, the failure analysis engine 16 simulates the propagation of the initial failure's effect through an avionics system described by the knowledge base and the simulation condition parameters. The result is a list of failures that would result from the initial failure. Additionally, a list of flight deck effects, which are the failure or warning indications that are presented to the flight crew via the flight deck, is generated. During a fault isolation analysis, the failure analysis engine processes the selected failure response "backwards" through the knowledge base to simulate a fault isolation analysis in an avionics system described by the knowledge base and the simulation condition parameters. The procedure results in a list of possible failure sources, i.e., faulty components, the failure of which may have caused the flight deck effect to be generated. Because the knowledge base along with the simulation condition parameters represents a specific avionics system operating configuration, by altering the knowledge base and/or the simulation condition parameters, a different avionics system operating configuration is defined and can be analyzed.

In one actual embodiment of the invention, the failure analysis system was hosted on an APOLLO workstation. The workstation included a central processing unit, memory, an output screen, and an input keyboard and/or mouse. In one embodiment, the failure analysis system is stored in the workstation memory. Alternatively, the failure analysis system may be downloaded from another source that is connected to the workstation.

The knowledge base 12 includes fact data and rule data that describe the avionics system and its behavior. In one embodiment, the fact data is subsystem interconnection data representing the physical interconnections between the Line Replaceable Units (LRU), i.e., path data, and the signal transfer between the LRUs, i.e., signal data. In one actual embodiment of the failure analysis system, the subsystem interconnection data was extracted from avionics system documentation describing LRU hard wire interconnections, an electrical power distribution database, and bus switching information included in a standard wiring diagram manual.

The rule data includes LRU failure and source selection rules. LRU failure rules describe how a given LRU will respond, in a specific operating configuration, if an input signal to the LRU fails. The LRU may totally or partially fail thereby affecting the status of the LRU's output signals. A simple example of a failure rule is "if signal-1 on bus-1 fails, then LRU-2 fails." The failure rule data also describes the results of an LRU failure, i.e., the subsequent condition of the failed LRU's output signals. Since the failure response of an LRU is considered a part of its function and is a design specification element, a major portion of the LRU failure response rules are extracted from LRU design specification information or from LRU requirements documents. Additional information related to an LRU response is obtained from the individual design engineer(s) responsible for the specific LRU design.

The source selection rules define how each LRU chooses its input data given the operating configuration and the status of its data sources. The source selection rules describe source switching that occurs at the signal level and is software driven. Typically, an LRU monitors input from a data source for signal validity. If the LRU determines that the input signal is invalid, its software control logic selects an alternate data source, if one is available. A simple example of a source select rule is "if signal-1 on bus-1 fails, then LRU-2 obtains signal-1 from bus-2." Typically, each LRU employs a unique source selection scheme. Thus, unique source selection rules are established for each LRU in the system. In one actual embodiment, the source selection rules are extracted from automatic Source Selection and Failure Detection (SSFD) logic that is included in the avionics system documentation.

One benefit of the present invention is the inclusion in the rule data of operating configuration contingencies, i.e., simulation conditions. An operating configuration contingency appears in the "if" statement of each rule and is referred to as the simulation condition code. Conceptually, each rule tests "if the simulation condition parameters entered by the system analyst match the simulation condition parameters in the rule, then . . . ." In other words, a rule is only considered pertinent to a specific failure analysis if it is a rule that describes LRU behavior in the operating configuration described by the simulation condition parameters.

The user interface 14 includes a set-up module and a failure analysis module. The set-up module allows the system analyst to assign values or statuses to simulation condition parameters. The failure analysis module allows the system analyst to select the type of simulation to be carried out and to identify a failed component or a failure response. In one actual embodiment, if failure propagation is to be simulated, the system analyst also inputs the desired level of failure propagation via the failure analysis module.

In one embodiment, source selection, system mode, and external condition parameters make up the simulation condition parameters. The source selection parameters describe the initial LRU input source selection. For some LRUs, data source selection is performed manually by the setting of flight deck source selection switches. A flight deck source selection switch drives a hardware relay that is internal or external to an LRU. Changing the position of a flight deck source selection switch actually changes the path along which a signal travels. System mode parameters describe the aircraft's flight trajectory. System modes include: take-off, climb, cruise, descend, land, and go-around. In each mode, the flight trajectory is further described by pitch, roll and autothrottle, i.e., power, parameters. The external condition parameters include speed and altitude.

With reference to FIG. 2, the set-up module provides the system analyst with a screen through which to enter the values or states of the simulation condition parameters. In one actual embodiment, the system analyst enters: aircraft identification, Instrument Select (IS) switch position, Flight Management Computer (FMC) master switch position, and Flight Director (F/D) switch position, autoflight (system) mode selections, and external conditions values. The switch positions dictate the data sources for specific LRUs at the beginning of the simulation. The autoflight mode selections dictate the system mode for the simulation. In one embodiment, if a parameter value is not entered by the system analyst, the user interface sets the parameter to a default value.

The failure analysis engine 16 includes an artificial intelligence (AI) shell and a failure analysis expert system. In one particular embodiment of the present invention, the AI shell comprises a commercially available PROLOG interpreter, QUINTUS PROLOG. Other AI shells may also be used. Suitable examples and definitions of expert systems and related entities may be found in *A Guide to Expert Systems* by Donald A. Waterman, Addison-Wesley, 1986. The AI shell for interprets or executes a specific PROLOG program, e.g., the failure analysis expert system. Before describing the failure analysis expert system in detail, an introduction to PROLOG is provided.

PROLOG is an AI language that is based on first-order predicate logic. The language is a list manipulation language that works against a knowledge base including facts and rules. Each fact consists of a statement about objects and their relationships. Each rule defines how to draw conclusions from given facts. The facts and rules are formatted in a manner such that it is sometimes difficult to distinguish them. For example, facts may be:

LRU-1 is a source for signal 1 to LRU-2.
LRU-3 is a source for signal 2 to LRU-2.

A rule might be:

If LRU-Z is a source for signal Y to LRU-X,
then LRU-X is a destination for signal Y.

In AI terms, if a rule's criteria are matched then the rule is "fired." The firing of the rule generally generates a response such as the establishment of a related fact or simply an indication that the rule is "true." In the example, when the conditions of the first line of the rule are met, the fact that some LRU, LRU-X, is a destination for a signal, signal Y, is established.

A system analyst may query a knowledge base. A sample PROLOG query is:

Is LRU-2 a destination for signal 1?

The expert system must determine whether the facts fit the rules in order to answer the query. In the present case, the expert system determines that according to the rule, if LRU-2 is a destination for signal 1, then there must be an LRU-Z that is a source for signal 1 to LRU-2. The expert system then references each fact in turn to determine whether there is a fact that provides a suitable LRU-Z. The first fact matches the information provided in the query. The value for LRU-Z is set to LRU-1 according to the fact. The rule is thus completed and fired. The firing of the rule results in the establishment of the fact that LRU-2 is a destination for signal 1. The new fact can be used during further processing by the expert system.

A PROLOG expert system also includes a mechanism for responding to a query with a list of possible responses. When discrete values for one or more variables are not included in the query, the expert system response is a set of possible values for the unknown variables that are extracted from the facts. For example, the query:

LRU-2 a destination for signal Y will return a list of all signals that are input signals for LRU-2 in the knowledge base. In the present example, the expert system again references the first rule to determine the logic for LRU-to-signal relationships. Then, the facts are considered, one at a time, to determine which facts in the knowledge base match all of the information provided in the query. For each fact that matches, the unknown variable information from the fact is presented to the system analyst. In the present query, the unknown variable is signal Y. Thus, the rule related to destination LRU's is considered in the form:

If LRU-Z is a source for signal Y to LRU-2,
then LRU-2 is a destination for signal Y.

Applying the rule to the facts, the first fact provides the information that LRU-2 is a destination for signal 1; the second fact provides the information that LRU-2 is a destination for signal 2. Thus, the system analyst is provided with the list response:

LRU-Z: (LRU-1, LRU-3)

If the knowledge base included other rules describing the logic for the relationship between LRU-2 and signals, each of the rules in turn would be analyzed in accordance with the facts. The process is repeated until all possible responses to the query, e.g., all rules and facts, are considered.

The failure analysis expert system of the present invention uses a combination of these types of queries. The failure analysis expert system is described in further detail in relationship to one actual knowledge base suitable for use with the present invention.

With reference to TABLE 1, one actual knowledge base includes path, signal, LRU subrule, result, and source select data. TABLE 1 includes data type formats in italics and data samples in regular type. The LRU subrule and result data comprise the LRU failure rule data.

TABLE 1

*path(bus ID, source LRU, destination LRU, switches)*
path(%OIL TEMP, FCC-B, AFC-AU, NONE);
path(+28V DC DIM BUS, AIRCRAFT, EIS-P, NONE);
*signal(source LRU, data ID)*
signal(CDU-L, MCDU-L-1-354);
signal(DAA-L, DAA-L-1-006);
signal(FCC-A, FCC-L-1-076);
*subrule(LRU, rule no., sim. cond. code, failed ID list, condition, response code)*
subrule(IRU-L, —9999, NWA1/----------/-/--/---/--/--/---/--/-/-,
    IRU-L-i-1-999-00, c-NONE-X-003, r-IRU-L-999)
*result(response code, text, data ID list, condition)*
result(r-ND-L-001, Remove MAP display and display MAP flag,
    IRU-L-A-3-320-00, c-NONE-X-002)
*src-sel(LRU, rule no., sim. cond. code, alternate ID list, failed ID list, condition)*
src-sel(IFMC-L, —S047, NWA1/----------/-/--/---/--/--/---/--/-/-,
    [IRU-L-A-3-367-00, URU-L-A-3-336-00, IRU-L-A-3-310-00],□);
src-sel(IFMC-L, —S050, NWA1/----------/-/--/---/--/--/---/--/-/-,
    [IRU-C-A-3-367-00, IRU-C-A-3-336-00], [IRU-L-A-3-367-00],
    IRU-L-A-3-366-00, IRU-L-A-3-310-00 [NCD, NO ACTIVITY])

The failure analysis expert system identifies the data types by name. The data type constructions are used to format queries. For example, in order to find a list of destination LRUs for bus-1 and source LRU-1, regardless of switch status, a query in PROLOG source code would be:

path(bus-1,LRU-1,LRU-X,)

In English, the query means—generate a list of distination LRUs from path data that match bus-1 and LRU-1 in the bus identification and source LRU fields, respectively. Each query for a specific data type must include a value or a null indicator in each field that is defined for the data type.

Simulation condition parameters are included in the subrule and source selection rule data. The parameters appear in the rules as codes formed by concatenating the simulation condition parameters that must be true for the rule to be applicable. For example, the parameters for the flight deck configuration illustrated in FIG. 2 are concatenated into the following code:

NWA1/LLALL-
RRARR/L/LR/1XX/VN/LN/VN-
/NA/280/35000.

The parameters are separated in the code by a "/". If a segment of the code is filled with "-", then the value of the particular parameter is irrelevant to the rule. In order to fire a specific rule, the rule's simulation condition code must match the simulation condition parameters that are selected for the simulation. By integrating the simulation condition code into the knowledge base rules, only the relevant portions of the knowledge base are used during a simulation. One benefit of the present invention is that individual knowledge bases do not have to be established for each operating configuration.

With reference to FIGS. 3A and 3B, in one actual embodiment the user interface formats the LRU failure rules and the source selection rules into readable logical statements. The logical statements provide further explanation of how the rules are applied. The data extracted from the rules appear in bold type in the logical statements. In order to obtain the display, the system analyst uses the user interface to select either an LRU failure rule or source selection rule, and then to identify the LRU name, LRU location, and unique rule number. The user interface extracts the data from the knowledge base. If an LRU failure rule is selected, the user interface extracts the LRU subrule identified by the unique rule number and then extracts the text and results for the response by matching the response code in the LRU subrule to the response code in the result data.

Figure 4:
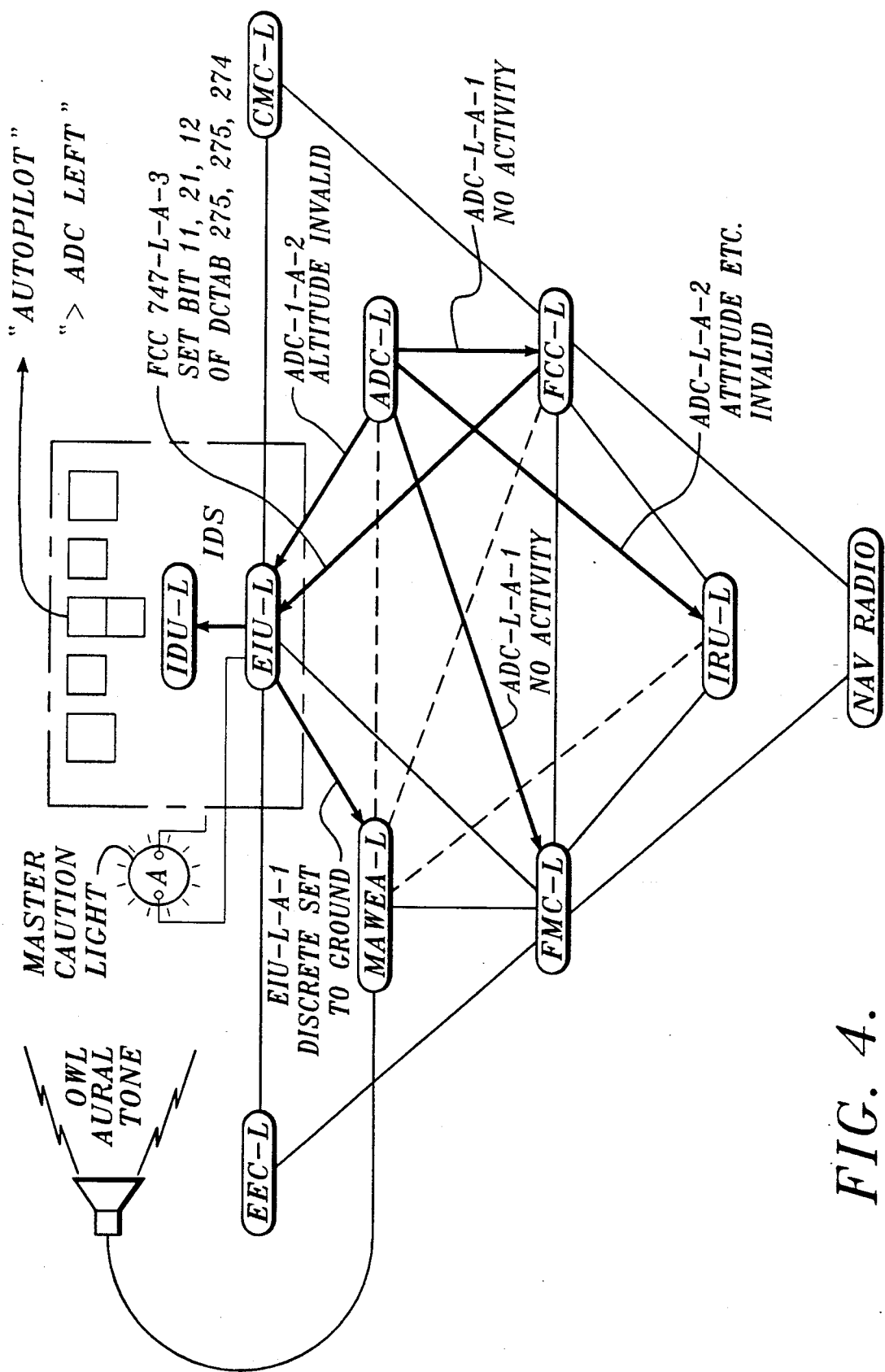
FIG. 4 is a schematic diagram of a subsystem failure effect propagation scenario.

Before describing the failure effect propagation simulation of the failure analysis expert system, a diagrammatical example of the propagation of an LRU failure's effect is presented. With reference to FIG. 4, a partial avionics system is illustrated, specifically a portion of the left side of the system. Thus, all of the LRUs illustrated have a right or some other counterpart system (not shown). An Air Data Computer-Left (ADC-L) failure's effect, given the simulation condition parameters illustrated in FIG. 2, results in at least three other LRUs experiencing some level of failure and causes at least two flight deck effects to be generated.

When the ADC-L fails, the status of all of the ADC-L outputs will be NO ACTIVITY, e.g., the ADC-L output signals are invalid. The output signal ADC-L-A-1, which is an input signal to the Flight Control Computer-Left (FCC-L) and the Flight Management Computer-Left (FMC-L) fails. The FCC-L responds by changing a status bit on a word on the FCC-L-A-3 bus, over which signals are transmitted to the Electronic Interface Unit-Left (EIU-L). The changed signal is detected by the EIU-L, which responds by generating an AUTOPILOT CAUTION message and an ADC-L ADVISORY message via the IDS. The EIU-L will also turn on a MASTER CAUTION light and initiate an OWL audio tone via the Modularized Avionics Warning Electronics Assembly (MAWEA). The FMC-L responds to the ADC-L-A-1 failure by reverting to alternate source ADC-R to obtain the signal ADC-R-A-1.

The Inertial Reference Unit-Left (IRU-L) receives the failed signal ADC-L-A-2, which has a status of NO ACTIVITY. The IRU-L sets output signals that are ADC dependent to a status of NO COMPUTED DATA (NCD). These output signals from the IRU-L are secondary information to the destination LRUs since the simulation condition parameters have identified IRU-R as the primary signal source. The destination LRUs receiving the IRU-L output signals are thus not affected by the signals with NCD. Other related failures or source selections may result from the ADC-L failure but are not illustrated here.

The representation of the interconnections between the LRUs, i.e., the ADC-L to FCC-L connection, is included in the path data. The representation of the transfer of the ADC-L-A-1 signal along the ADC-L to FCC-L connection is included in the signal data. The failure response of the FCC-L to the NO ACTIVITY status of the ADC-L-A-1 signal is included in the LRU subrule and result data. Finally, the reversion of the FMC-L to alternative source ADC-R is included in the source selection rule data.

Figure 5:
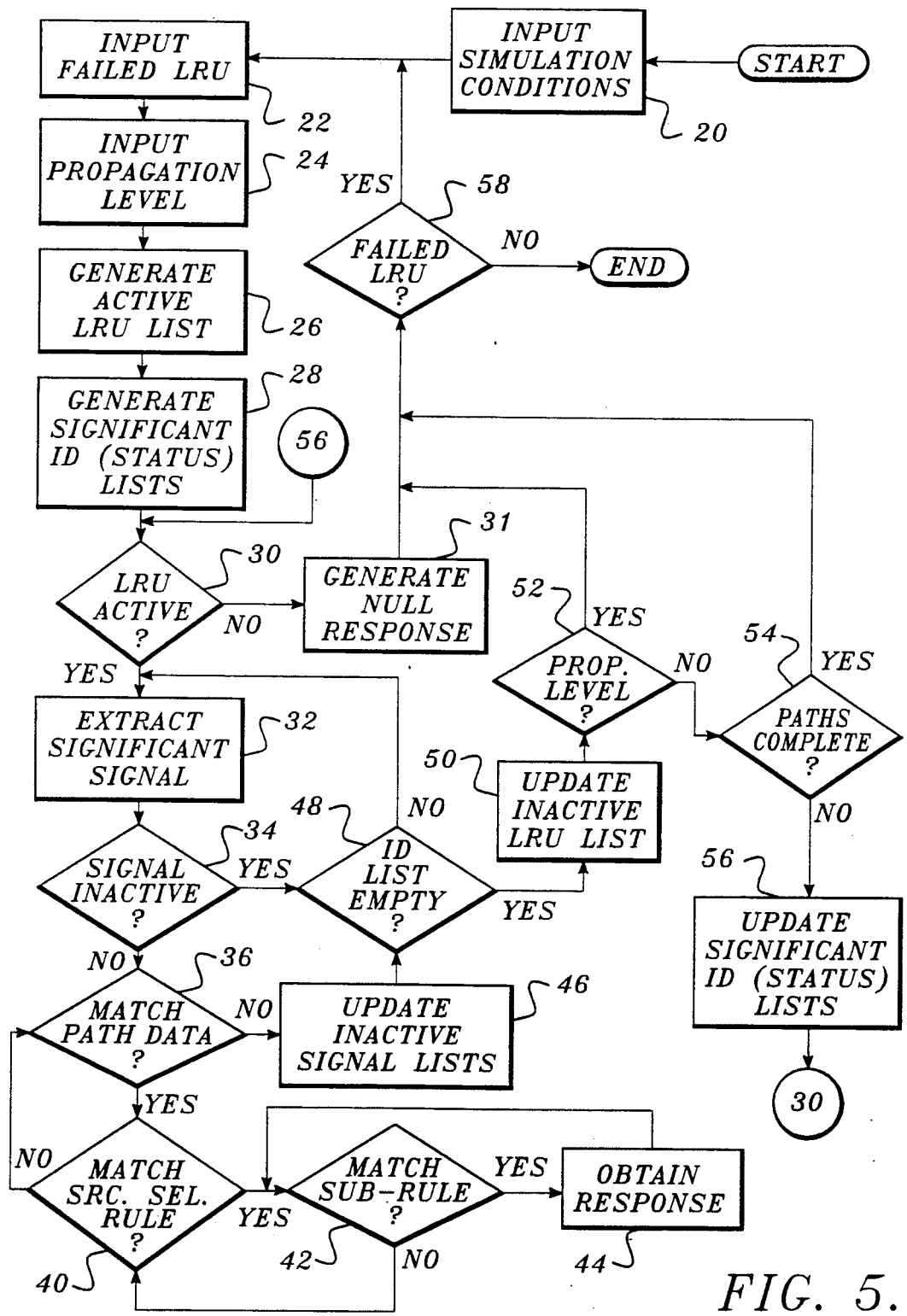
FIG. 5 is a flow diagram of a simulated failure effect propagation in accordance with the present invention.

With reference to FIG. 5, in order to simulate the propagation of the effect of a failure, the set of output signals for the failed LRU is obtained from the signal data. For each output signal, termed significant signal, and failed LRU pair, the destination LRUs are identified from the path data. For each destination LRU, the source rules are referenced to determine whether the destination LRU is actively receiving the significant signal from the failed LRU. For each destination LRU that is actively receiving a significant signal from the failed LRU, the response of the destination LRU to the significant signal is analyzed. Each subrule related to the destination LRU is considered. The firing of a destination LRU subrule indicates that the response identified by the subrule response code would be generated by the destination LRU given the significant signal condition and the specific simulation conditions. If the subrule is fired, the destination LRU has failed and a description of the failure is found in the result data that matches the response code from the fired subrule. The result data is used to identify the next level of failures that must be analyzed. The process is repeated until no more destination LRUs are identified.

The expert system records those LRUs and signals that would fail during the propagation as the failure history, displays the failure responses at each level of propagation, and displays the flight deck effects that result from the failure(s). The failure history from each failure simulation is used when multiple failures are simulated. To analyze multiple failures, each subsequent failure is propagated through the knowledge base in accordance with the simulation conditions and the prior failure history.

To begin the simulation of a failure effect propagation, the system analyst inputs values for the condition simulation parameters at block 20 and identifies a failed LRU at block 22. In one embodiment of the present invention, once begun, the failure propagation simulation continues until all failure paths are exhausted. In an alternative embodiment, at block 24, using the user interface, the system analyst specifies the layer of propagation to which the simulation will run. A layer of propagation is defined by the LRU connections. For example, if LRU-1 is connected to LRU-2 and LRU-3 which, in turn, are connected to LRU-5 and LRU-6, and LRU-7 and LRU-8, respectively, then the first level of propagation based on a failure of LRU-1 analyzes the effects of the failure on LRU-2 and LRU-3. The second level of propagation analyzes the effects of the failure(s) on LRU-5 through LRU-8. The propagation level selection option allows the system analyst to limit the scope of the propagation analysis. If a level of propagation is selected, a propagation counter is initialized to 1.

At block 26, the failure analysis expert system uses the simulation condition parameters, an Inactive LRU list, and the source selection rules to generate an Active LRU list. The Inactive LRU List includes all of the LRUs that failed during previous failure simulation sessions. During the first failure simulation session, the Inactive LRU list is empty. Each LRU identified by the simulation conditions parameters that is not on the Inactive LRU list is included on the Active LRU list. The source selection rules that describe LRU selection for LRUs identified by the simulation condition parameters are analyzed against the Inactive Signal List, also a null list at the start of the simulation. The analysis determines whether the source LRU in the source selection rule is a primary LRU when the simulation begins. Each primary LRU that is not included on the Inactive LRU list is included in the Active LRU list. The Active LRU list thus identifies all the LRUs that were actively involved in signal transfer immediately before the failure occurred.

At block 28, the failure analysis expert system generates a Significant ID list and a Significant ID Status list, hereinafter referred to in combination as the Significant ID/Status lists. The Significant ID list includes all failed signals for a level of propagation. In one actual embodiment, the LRU failure that is analyzed is a complete failure, i.e., each output signal from the LRU fails. Thus, during the first level of the failure propagation analysis, the Significant ID list identifies all signals output by the failed LRU, i.e., the signal failures at propagation level-1. In alternative embodiments, an LRU failure that does not cripple all of the output signals may be analyzed. To generate the Significant ID list, all signal data that includes the failed LRU as its source LRU, is identified. The data ID lists are extracted from the matched signal data and comprise the Significant ID list. For each subsequent level of propagation, the list contains all failed signals, and an identification of the source LRU, at the particular level. The Significant ID Status list matches a status to each signal in the Significant ID list.

Once the Significant ID/Status lists have been created, at block 30 the failure analysis expert system compares the failed LRU to the Active LRU list. If the failed LRU is not inactive, the failure analysis expert system executes a layer-by-layer simulation of failure effect propagation by considering the affect of each signal failure on the next level of LRUs. If the failed LRU is not on the Active LRU list at block 30, then the LRU is not actively involved in signal transfer and therefore the failure does not affect the operation of the avionics system. Since the LRU failure will not affect the avionics system, a null failure response is generated at block 31. The failed LRU is added to the Inactive LRU list. The appearance of the failed LRU on the Inactive LRU list ensures that the LRU cannot be source selected during further failure simulation in the same session. All of the failed LRU's output signals are appended to an Inactive Signal list. As with the Inactive LRU list, the Inactive Signal list includes all signals failed during previous failure simulation passes.

At block 32, a significant signal and its status are extracted from the Significant ID/Status lists. If, at block 34, the significant signal was active prior to the failure, the failure analysis expert system determines the active destination LRUs for the failed LRU and significant signal pair, and analyzes the failure response for each destination LRU in turn. At block 36, the query to extract this information is:

path(significant signal, failed LRU, Destination LRU)

The query will find the first, or next, path data matching the significant signal and failed LRU identifications, and will return a destination LRU from the matched data.

The identified destination LRU is compared to the Inactive LRU list to determine whether it was inactive prior to the failure, and thus would not be affected by the initial failure. If the destination LRU is not on the Inactive LRU list then the process continues forward. Otherwise, the destination LRU was already inactive or not in use prior to the failure and the fact that it may fail does not affect the behavior of the avionics system.

If the destination LRU was not previously inactive, at block 40, the source selection rules are referenced to determine whether the failed LRU is the primary source for the significant signal into the destination LRU. If the failed LRU is not the primary source, e.g., the destination LRU is receiving the significant signal from an alternative source, then the significant signal failure will not affect the behavior of the destination LRU and the analysis for the destination LRU is complete. A query to match a source selection rule with the destination LRU is:

src-sel(dest. LRU, rule ID, sim. cond., alternate ID list, failed ID list, condition)

The query matches the destination LRU to the first, or next, source selection rule and retrieves values for the other rule variables. The values in the last three fields are considered in order to determine whether the source selection rule should be "fired". The simulation condition code (sim. cond.) is compared to the simulation condition parameters. If the code and parameters match, then the rule is relevant to the operating configuration identified by the simulation condition parameters. Next, each of the entries in the failed ID list is compared to the Inactive Signal list and the Inactive Signal Status list, hereinafter referred to in combination as the Inactive Signal/Status lists. If each of the elements in the failed ID list appears in the Inactive Signal/Status lists, that indicates that the requisite signal failures have occurred for a signal in the alternate ID list to be a primary source. The process then determines whether the significant signal is included in the alternate ID list. If the significant signal is included in the alternate ID list, then the conditions are met for the rule to be fired, i.e., for the failed LRU to be a primary source of the significant signal for the destination LRU. If no source selection rules are matched, then the analysis for the destination LRU is complete and the process returns to block 36 to consider the next destination LRU.

At block 42, an LRU subrule that matches the destination LRU is found. The query to find a matching LRU subrule is:

subrule(dest. LRU, rule ID, sim. cond., data ID list, cond., resp. code)

The query matches the first, or next, subrule that includes the destination LRU and returns the values for the remaining rule variables. A determination is made as to whether the matched subrule should be fired. To satisfy the subrule, the simulation condition parameters must match the simulation condition code, the significant signal must be included in the data ID list, and the significant signal status must be the same as the condition. If the rule is completely satisfied, then the rule is fired. A subrule that is fired indicates that the response, identified by the subrule response code, would be generated by the destination LRU given the status of the significant signal.

The text describing the destination LRU response and the resulting failure(s) is obtained from the result data. The response code from the subrule is matched to the response code in the result data at block 44. The query to do is:

result(response code, text, data ID list, condition)

The query returns the text describing the destination LRU response. The query also returns a data ID list and condition that describe the adverse effect on the destination LRU's output signals. The response is displayed to the system analyst or written to a result file. If the matched result data indicates that signal failure(s) will occur at the next level of propagation, i.e., the data ID list is not empty, the data ID list and condition from the matched result data are added to the Next Significant ID list and Next Significant ID Status list, hereinafter referred to in combination as the Next Significant ID/Status lists. The identification of the destination LRU is embedded in the signal identification in the Next Significant ID list. Thus, during the next level of propagation simulation, at block 30, the significant signal and failed LRU information is available from the Next Significant ID list.

The process returns to block 42 to match the next subrule. If no subrules are matched and fired, the process returns to block 40 to match the next source selection rule. If, at block 40, all of the source selection have been matched and fired, then the process returns to block 36 to determine whether all of the destination LRUs have been considered. If all of the destination LRUs have been considered then the analysis of the significant signal is complete. At block 46, if the significant signal is unique to the Inactive Signal list, it is added thereto.

Returning to block 34, if the signal is on the Inactive Signal list, the failure analysis expert system generates no response since the signal state will not affect system behavior. In this case, and in the case that the significant signal has been completely analyzed, at block 48, the Significant ID list is checked for additional signal entries. If the list is not empty, the next signal is extracted from the Significant ID list and analyzed beginning at block 32. Otherwise, the current layer of propagation is complete.

Once the current layer of propagation is complete, the LRU(s) that were analyzed during the current layer of propagation are appended to the Inactive LRU list at block 50. The system then determines whether the selected level of propagation has been reached at block 52 by comparing the input propagation level to the propagation level counter. If the input and counter match, the simulation is complete. Even if the selected level has not been reached, the propagation simulation is complete if there are no other failure paths to analyze. At block 54, the Next Significant ID list is referenced. If the Next Significant ID list is empty, then there are no other failure paths and the propagation simulation is complete.

If, at block 54, not all paths are exhausted, the Significant ID/Status lists are reset to the Next Significant ID/Status lists at block 56. The propagation level counter is incremented by one. The analysis of the next level of propagation begins at block 30.

At block 58, if an additional failure is to be analyzed during the same session, the system analyst selects further analysis. The failure analysis expert system returns to block 22 and prompts the system analyst to identify a failed LRU. The Inactive LRU and Inactive Signal lists from the previous session(s) provide a history of the existing LRU failures. The history is used during subsequent failure simulation sessions to simulate a failure occurring in an a system already affected by one or more failures.

In one preferred embodiment, the system analyst can change the LRU failure rules or the source selection rules during a simulation session using the user interface. Using this option, LRU design changes can be immediately analyzed before the subsystem is actually built. A knowledge base editor facilitates real time modifications to the LRU failure and source selection rules. The editor enhances the usefulness of the failure analysis system during an avionics system design phase, allowing interactive analysis of the failure responses of several system designs during a single simulation session.

Another important aspect of avionics system testing is fault isolation. Fault isolation is essentially the reverse of a failure effect propagation since a set of possible failure sources are generated from a set of flight deck effects. Generally, an LRU fault results in one or more flight deck effects depending on the severity of the fault and its potential impact on flight safety. Flight deck effects include messages shown on the Engine Indicating and Crew Alerting System (EICAS) displays and Control Display Units (CDUs), symbols or erroneous data on the Primary Flight and Navigation Displays (PFDs and NDs), caution and warning lights, and alarms. It is feasible that a number of discrete faults will result in the generation of the same flight deck effect(s). Thus, the flight or maintenance crews do not always know the source of a given flight deck effect. The failure analysis expert system includes a recursive backtracking procedure for isolating the source(s) of a flight deck effect. The fault isolation analysis can be used by maintenance personnel to generate a set of possible fault sources from a flight deck effect(s) and a set of simulation condition parameters.

One benefit of the present fault isolation analysis is that an actual operating configuration can be recorded when a flight deck effect occurs in-flight and then the simulation condition parameters can be set equal to the actual conditions. The combination of the knowledge base with the simulation condition parameters describes an avionics system configuration equivalent to the one in which the flight deck effect actually occurred. In this manner, the possible sources for the flight deck effect(s) are narrowed to those that are relevant to the actual operating configuration.

The fault isolation analysis follows each possible fault source, one source at a time, from the flight deck effect to the fault source. The analysis continues until all possible fault sources are identified. In order to identify each of the LRUs that might have caused the flight deck effect, i.e., initial response, to be generated, the subrules are considered to identify those subrules that describe the generation of the initial response. A relevant subrule identifies a destination LRU, which, if failed, could have caused the response to be generated. The subrule is only analyzed if the simulation condition code in the subrule matches the simulation condition parameters describing the operating configuration. If a subrule is relevant, the result data is referenced to identify those responses that would have caused an input signal to the destination LRU to fail. Each identified response, in turn, is then analyzed as described above until a source LRU is found. The recursion continues until all relevant subrules and all possible failed signals are analyzed.

Figure 6:
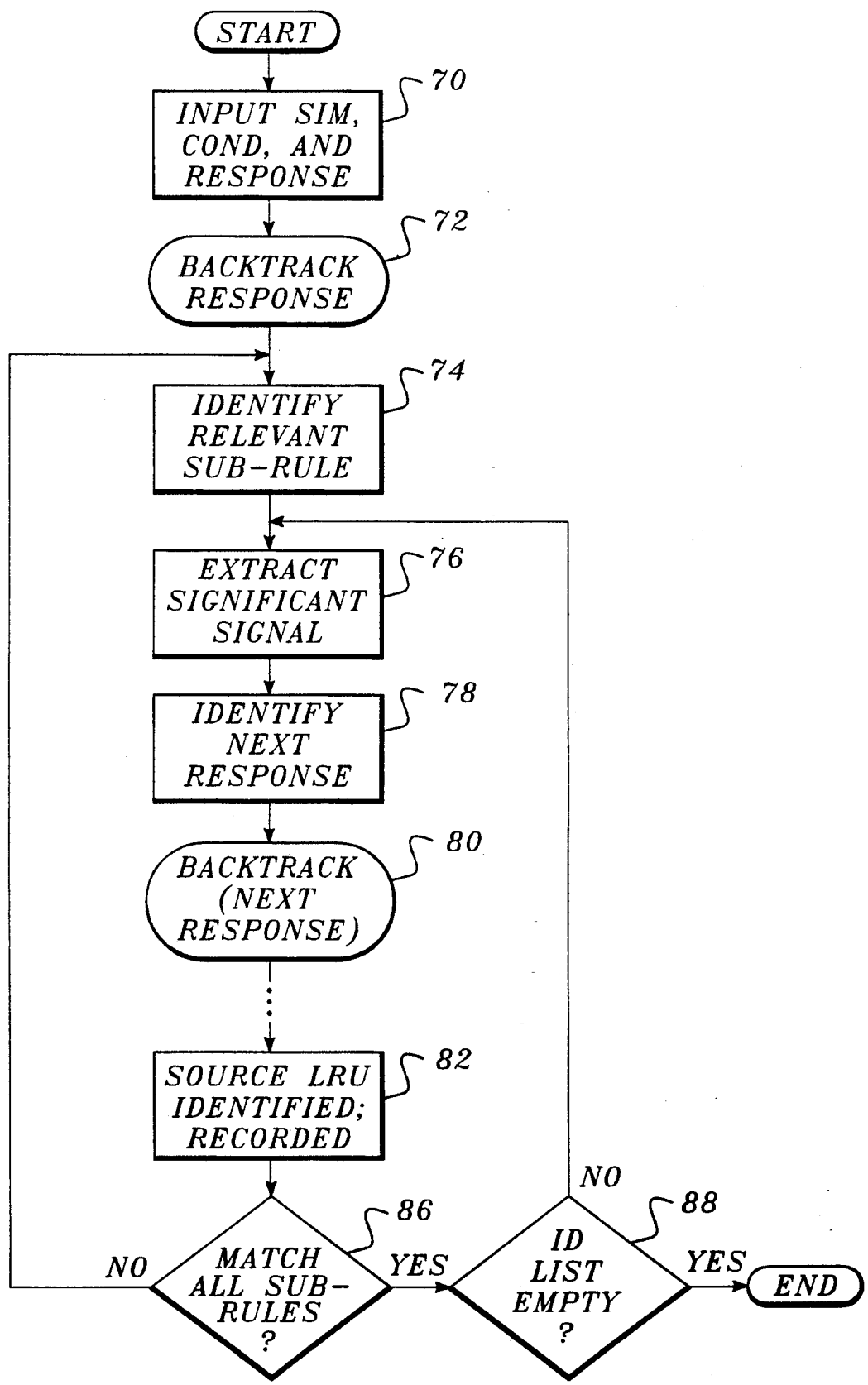
FIG. 6 is a flow diagram of a fault isolation analysis in accordance with the present invention.

With reference to FIG. 6, the first portion of the fault isolation analysis is similar to the failure propagation simulation. At block 70, the system analyst utilizes the set-up module screen to establish the simulation condition parameters. The system analyst selects the flight deck effect, i.e., initial response, via the failure analysis module. Alternatively, the simulation condition parameters and/or flight deck effect may be initialized according to recorded in-flight data that describes the actual flight operating configuration during which a flight deck effect occurred. Such data might be read from a tape or other data storage device. At block 72, the backtrack recursive process begins against the initial response.

At block 74, the response is matched in the LRU subrules to find a subrule that would, if fired, cause the response. The relevant subrules identify the initial response in their response codes. The query is:

subrule(dest. LRU, rule no., sim. cond. code,
    data ID list, condition, response code)

Values for data ID list, condition, simulation condition code, and destination LRU are extracted from the matched subrule. The simulation condition code is matched to the simulation condition parameters. Only those subrules having a code that matches the parameters are considered. The destination LRU from the matched subrule is an LRU that would experience a failure and cause the response to be generated if one or more of the signals from the data ID list, i.e., input signals to the destination LRU, had a status equivalent to the condition. At block 76, a significant signal is extracted from the subrule data ID list.

The next step is to identify result data that might be related to the subrule. By identifying relevant result data, i.e., by matching the condition and the significant signal from the subrule in the result data, a response code that may describe the subrule is identified. In other words, the result data that is sought describes a response, identified by the response code, that causes the significant signal to experience the condition in the subrule. The response code identifies the next response that must be considered as a possible link in the fault isolation simulation. At block 78, the condition from the subrule is matched in the result data. The query is:

result(response code, data ID list, condition).

A response code and a data ID list are extracted from the matched result data. The response code identifies the next response. The data ID list identifies the signals that are affected by the next response. The significant signal is compared to the data ID list extracted from the matched result data. If the significant signal is included in the data ID list, then the next response describes a response that may have caused the significant signal to experience the given condition. Since the next response may have caused the initial response, the source of the next response must be traced. The backtrack process is recursively executed beginning at block 80 against the next response.

The recursive execution of the steps described at blocks 74–80 are repeated until the bottommost destination LRU is found. In other words, the backtrack process is completed when, at block 74, no LRU is identified that generates signals that would cause the destination LRU to fail. The destination LRU is then a possible original source for the initial response.

Once a possible source of the initial response is identified as block 82, the destination LRU is displayed or stored. At block 86, the procedure considers whether all of the subrules that match the destination LRU and the simulation condition parameters have been matched. If they have not been, the procedure returns one level up in the recursion process to block 74. If all of the subrules relevant to a destination LRU have been considered, at block 88, the procedure determines whether all of the significant signals in the data ID list have been analyzed. If the data ID list is not empty, then, at block 76, the next significant signal is extracted from the list and the process of matching the next result data by the condition value is performed. Once all of the signals in the data ID list have been completely backtracked, the procedure ends. Since the procedure is recursive, it steps one level up in the recursion to block 74 and continues. The process continues until each possible source is identified. As noted, as the possible sources are identified, they are displayed or written to a file. The system analyst may then use the list of possible faults as a starting point for further testing of the avionics system in order to identify the true or most likely source(s) of the flight deck effect response.

Given the size and complexity of a modern avionics system, the list of possible faults that may have caused a response can be extensive. Further, the fault isolation analysis execution time may be fairly long even in systems with sophisticated equipment. For this reason, in one preferred embodiment, failure probabilities are associated with each LRU and output signal pair in the subrule data. The use of failure probabilities facilitates the establishment of a hierarchy of the possible signal paths leading to a source. In this manner, possible sources exhibiting a probability below a preset minimum are eliminated. At block 74 of the fault isolation analysis, only those subrules having a probability analysis, greater than the preset minimum, would be considered.

While preferred embodiments of the invention have been illustrated and described, it should be appreciated that various changes can be made therein without departing from the spirit and scope of the invention.

As a design aid, the failure analysis expert system benefits the avionics design engineers in many ways. By providing access to an automated simulation of failure effect propagation, the logic in each LRU and in the overall system can be validated to reveal any potential design problems. Any problems can then be corrected in the early stages of the system design. Once an avionics system is created, a knowledge base describing the as-built system can be maintained so that the failure analysis expert system can be used as a system failure analysis tool. The implementation of the failure analysis system via an expert system produces a system that is compact enought and fast enough to be stored and implemented at a workstation environment.

In one alternative embodiment, the failure analysis expert system is expanded to simulate avionics failures due to electrical and mechnical system failures (e.g., electrical power and servo actuator failures). The data describing the electrical power and mechanical interconnections and the related LRU responses to failures are included in the fact and rule portions of the knowledge base. The present invention is also applicable to systems that utilize other types of signal transfer means such as fiber optics.

In one actual embodiment of the present invention, several types of failures can be simulated including LRU shut down, signals with NO COMPUTED DATA (NCD), data with Sign Status Matrix (SSM) failure, bus transmit failure, and bus receive failure, bus line short, destination side bus open at the source or at the destination, servo failures, power interruption, generator failure during autoland. Depending upon the type of failure selected, the failure analysis module of the user interface prompts the system analyst for failure identification information. For example, for a single signal failure, the system analyst identifies the failure by a bus name, source LRU, signal name, and failure status.

The embodiments of the invention in which an exclusive property or privilege is claimed are defined as follows:

1. An apparatus for analyzing failure effect propagation in an electronic system having at least one system mode, the electronic system comprising a plurality of interconnected subsystems, each of which receives input signals and transmits output signals according to the subsystem's own response logic, wherein said interconnected subsystems include at least two redundant subsystems, which generate identical output signals, and at least one switching mechanism for selecting one of the redundant subsystems as a primary signal source for a destination subsystem, the apparatus being integrated into a processor including a central processing unit, a memory, and input and output devices, the apparatus comprising:

(a) a knowledge base for simulating the electronic system in a variety of operating configurations, said knowledge base including subsystem interconnection data, and rule data, said rule data including operating configuration contingencies;

(b) a user interface including means for receiving simulation condition data that identifies an operating configuration of the electronic system and failure data that identifies at least one subsystem failure; and (c) failure analysis means, coupled to the knowledge base and the user interface, for simulating an effect of a subsystem failure as the subsystem failure propagates through the electronic system by analyzing said failure data in accordance with said knowledge base and said simulation condition data, and for generating a set of subsystem failure responses that would occur in the electronic system if the subsystem failure were to occur.

2. An apparatus as claimed in claim 1, wherein said operating configuration is related to a status of the switching mechanisms, and said simulation condition data includes source selection data for identifying a switching mechanism selection.

3. An apparatus as claimed in claim 1, wherein said simulation condition data includes mode selection data for identifying a system mode of the electronic system.

4. An apparatus as claimed in claim 2 or 3, wherein said simulation condition data further includes external operating condition data.

5. An apparatus as claimed in claim 1, wherein said subsystem interconnection data includes path and signal data.

6. An apparatus as claimed in claim 1, wherein said rule data includes subsystem failure rules and source selection rules.

7. An apparatus as claimed in claim 1, wherein the electronic system is an avionics system and the subsystems include line replaceable unit(s) (LRU).

8. An apparatus as claimed in claim 7, wherein said rule data includes LRU subrules and result data, wherein said result data describes a set of subsequent failures that are generated due to the failures described by said LRU subrules.

9. An apparatus as claimed in claim 1,
wherein said user interface further includes means for receiving failure response data, and
wherein said failure analysis means further includes means for predicting a source of a failure response identified by said failure response data in the electronic system by analyzing said failure response data in accordance with said knowledge base and said simulation condition data, whereby a possible subsystem source of the failure response is identified.

10. An apparatus as claimed in claim 1 or 9, wherein said failure analysis means includes expert system means for controlling the failure analyses and an artificial intelligence shell for interpreting said expert system means via said central processing unit.

11. A method for analyzing failures in an electronic system having at least one system mode, the electronic system comprising a plurality of interconnected subsystems, each of which receives input signals and transmits output signals according to the subsystem's own response logic, wherein the interconnected subsystems include at least two redundant subsystems, which generate identical output signals that are transmitted to a destination subsystem and at least one switching mechanism for selecting one of the redundant subsystems as a primary signal source for a destination subsystem, the method being carried out by a processor including a central processing unit, a memory, and input and output devices, the method comprising the steps of:

(a) creating a knowledge base, said knowledge base simulating the electronic system in a variety of operating configurations, said knowledge base including subsystem interconnection data and rule data, said rule data including operating configuration contingencies;

(b) receiving simulation condition data for identifying an operating configuration and failure data for defining at least one subsystem failure;

(c) simulating an effect of the subsystem failure as the subsystem failure propagates through the electronic system by analyzing said failure data in accordance with said knowledge base and said simulation condition data; and (d) generating a set of subsystem failure responses.

12. The method as claimed in claim 11, further including the steps of
receiving failure response data,
predicting a source of a failure response identified by said failure response data in said electronic system by analyzing said failure response data in accordance with said knowledge base and said simulation condition data; and
identifying a possible subsystem source of the failure response.

* * * * *